United States Patent Office 3,070,546
Patented Dec. 25, 1962

3,070,546
NITROGEN-, PHOSPHORUS- AND SULFUR-
CONTAINING LUBRICANTS
Thomas A. Butler, Cleveland, and Alan Rhodes, Willoughby, Ohio, assignors to The Lubrizol Corporation, Wickliffe, Ohio, a corporation of Ohio
No Drawing. Filed Jan. 16, 1959, Ser. No. 787,134
12 Claims. (Cl. 252—32.7)

This invention relates to lubricant compositions, more particularly to lubricating oil compositions improved by the incorporation therein of certain nitrogen-, phosphorus- and sulfur-containing compositions. Such lubricant compositions are adapted especially for use in the lubrication of power-transmitting units which employ frictional clutch plates or other such surfaces.

Power-transmitting units of the above type are useful for many purposes. One such use consists of the mechanical clutch type transmission units found in automotive vehicles for transmitting power from the engine to the differential. Recently they have also found usage in certain new automotive differentials. Units of this type depend upon smooth and firm engagement of clutch plates for efficient transmission of power. To provide such smooth operation, the lubricant used must possess a unique combination of lubricating properties. Thus, in addition to the ordinary properties of resistance to corrosion, oxidation, and extreme pressure, oiliness, detergency, etc., the lubricant used must posses suitable frictional properties as well. It must be capable of allowing the clutch plates to slide smoothly into contact and then to become firmly engaged with each other. It must not permit slipping of the engaged plates even when heavy loads are applied to the unit; neither must it permit grabbing of the plates while they are being engaged or disengaged. Failure of the lubricant to satisfy the above frictional requirements will result in interrupted and inefficient transmission of power, which generally manifests itself in the development of a chatter-like noise. If such operation is allowed to continue for an extended period, it will result in excessive wear and premature breakdown of the unit in use.

The development of the chatter-like noise is recognized as a reliable indication of inadequate, unsatisfactory lubrication and various methods have been developed which will permit the measurement of such noise as a means of evaluating the lubricant.

It is accordingly an object of this invention to provide improved lubricant compositions.

It is another object of this invention to provide lubricant compositions for use in power-transmitting units.

It is another object to provide lubricant compositions which are especially useful for lubricating power-transmitting units employing frictional clutch plates.

It is another object to provide lubricant compositions for automatic transmissions.

It is also an object to provide lubricant compositions for automotive differentials.

These and other objects are attained in accordance with this invention by providing a lubricant composition comprising a lubricating oil and in combination therewith from about 0.01 to about 2.0 percent by weight as phosphorus of an oil-soluble group II metal phosphorodithioate and from about 0.05 to about 3.0 percent by weight of an oil-soluble carboxy amide having at least about twelve aliphatic carbon atoms.

Group II metal phosphorodithioates are well-known compositions. They may be exemplified by barium, magnesium, strontium, cadmium, calcium, and zinc salts of a phosphorodithioic acid having the formula:

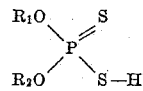

wherein $R_1$ and $R_2$ are like or unlike organic radicals, each containing from 1 to about 40 carbon atoms. Of these metal salts, zinc phosphorodithioates have been found to be especially effective as lubricant additives, and they are accordingly preferred for use in this invention. Methods for preparing phosphorodithioic acids and their metal salts have been described in the art and need not be discussed in detail here. The most convenient method for preparing the acid comprises the reaction of phosphorus pentasulfide with an appropriate hydroxy compound, i.e., alcohol or phenol, according to the following equation:

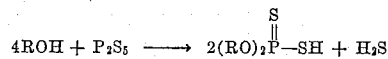

wherein ROH represents the hydroxy compound. The corresponding metal salts are obtainable simply by neutralizing the acid with a basic metal compound such as a metal hydroxide, metal oxide, or by reaction of the acid with an elemental metal.

The particular group II metal phosphorodithioates of this invention are those derived from phosphorodithioic acids in which there are a total of at least about 7.6 aliphatic carbon atoms in the two organic radicals attached to each phosphorus atom of the acid molecule. Such salts are well-known in the art, and certain subgroups thereof are described in U.S. Patents 2,838,555; 2,689,220; 2,680,123; 2,364,283; and 2,364,284. Those derived from dialkylphosphorodithioic acids are preferred for use in the lubricants of this invention because of their particular effectiveness in combination with the fatty amide additives. The alkyl radicals commonly found in such phosphorodithioates may be illustrated by, for example, octyl, dodecyl, pentyl, isopropyl, cyclohexyl, octadecyl, methylcyclohexyl, and the like.

Specific examples of the oil-soluble group II metal phosphorodithioates include: zinc dicyclohexyl phosphorodithioate, zinc diisoctyl phosphorodithioate, calcium dicyclopentyl phosphorodithioate, barium dioctadecyl phosphorodithioate, cadmium diheptyl phosphorodithioate, the zinc salt of a mixture of 40 mole-percent of di-n-octyl phosphorodithioic acid and 60 mole-percent of diisopropyl phosphorodithioic acid, the zinc salt of a mixture of equimolar amounts of di-sec-pentyl phosphorodithioic acid and diisopropyl phosphorodithioic acid, the barium salt of a phosphorodithioic acid derived from a mixture of 60 mole-percent of cyclohexanol and 40 mole-percent of n-butanol, the zinc salt of a phosphorodithioic acid derived from a mixture of 65 mole-percent of isobutanol and 35 mole-percent of isopropanol, strontium isopropyl n-hexyl phosphorodithioate, magnesium di-(amylphenyl) phosphorodithioate, cadmium isopropylphenyl heptyl phosphorodithioate, calcium methyl methylcyclohexyl phosphorodithioate, calcium ethyl octadecyl phosphorodithioate, etc.

The oil-soluble carboxy amides useful in this invention are those having the structural formula

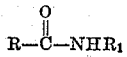

where R is an aliphatic hydrocarbon radical having at least about 12 carbon atoms and $R_1$ is selected from the class consisting of aliphatic hydrocarbon radicals and hydrogen. Especially valuable are the fatty acid amides and the naphthenic acid amides. They may be illustrated by the amides of, e.g., oleic acid, stearic acid, lauric acid, palmitic acid, petroleum naphthenic acid, linoleic acid, linolenic acid, arachidic acid, and mixtures of acids such as those obtained from the hydrolysis of vegetable or animal fats. Also contemplated are the N-substituted fatty acid amides in which the N-substituent is generally a hydrocarbon radical such as methyl, cyclohexyl, dodecyl, etc. The amides of fatty acids having about 16–24 aliphatic carbon atoms in the fatty radical have been found to be especially effective and accordingly they constitute a preferred class of amides for use in the lubricant compositions of this invention. Specific examples of the useful fatty acid amides include: oleamide, stearamide, N-methyl oleamide, N,N-dibutyl lauramide, myristamide, palmitamide, N-cyclohexyl stearamide, and mixtures of such amides. The carbon atom content of such amides may range up to 60 or higher.

The base oils which are useful with the additive combinations of this invention may be any oils having lubricating properties, irrespective of their source or methods of production. For the most part, lubricating oils of petroleum origin and having viscosity values within the approximate range of 50–3000 SUS (Saybolt Universal seconds) at 100° F. are most commonly used.

The amounts of the phosphorodithioate additive and the amide additive which should be used in the lubricants of this invention lie within relatively narrow ranges of concentration. The amount of the phosphorodithioate additive is within about 0.01% to about 2% by weight, as phosphorus, based upon the weight of the final lubricant, and that of the amide additive is within about 0.05% to about 3% by weight. For use in most applications, the optimum amount of the phosphorodithioate additive is within the range of concentration of 0.1%–1% by weight as phosphorus, and that of the amide additive is within the range of concentration of 0.1%–1% by weight. Except for considerations of economy, there is usually no disadvantage in using more than the optimum amount needed for a particular application.

The lubricant compositions of this invention are useful for lubricating gears, bearings, torque converters, internal combustion engines, and other machines which employ relatively moving solid surfaces. They are especially valuable, as indicated before, for use in the lubrication of power-transmitting units employing frictional clutch surfaces such as are found in the mechanical clutch type automatic transmission units and differentials of automotive vehicles. An especially effective use of such compositions is in the lubrication of the so-called "locking" differential, also known as the "non-slip" or "limited-slip" differential. Such a differential is capable of locking the two driving axle shafts into one rigid unit and this is especially useful under driving conditions such as those encountered in operating a car in snow or mud. By such axle-locking, the two driving wheels must spin at the same speed and consequently, unlike the conventional type, the locking differential is capable of preventing the loss of axle torque through the free spinning of any one wheel which may happen to be driven on an icy patch of pavement for example. The locking of the axles is done through the use of frictional clutch plates or other such surfaces attached to both of the axle shafts, which clutch plates are capable of becoming firmly engaged when the above driving conditions exist.

Satisfactory operation of this type of differential quite obviously requires a lubricant having suitable frictional properties in addition to the ordinary lubricating properties. Hence, lubricants which are adequate for use in conventional differentials are not necessarily satisfactory for use in the locking differential. It has now been discovered, however, that by the combined use in a lubricating composition of the phosphorodithioate and amide additives of this invention, a synergistic effect is produced which is sufficient to allow the satisfactory performance of such differentials.

The desirable frictional properties of the lubricant compositions of this invention are shown by the results, summarized in Table I, of an exaggerated chattering test. In this test, the chattering characteristics of a lubricant are measured in terms of the intensity of noise developed during the engagement of a rotating plastic friction plate with a stationary steel friction plate while the interface between the plates is being lubricated by the test lubricant. The test is conducted under conditions simulating that encountered in actual operation of many types of commercial transmissions and clutches. In brief, the apparatus employed in this test consists of: (1) a carbon steel cup (having an inner horizontal flat surface) equipped with a chatter-transmitter microphone wired to an electronic audio-amplifier which is in turn wired to an electric output recording meter for measuring the chatter-intensity, the base of the cup being used both as a reservoir for the test lubricant and as one of the test friction plates; (2) a hard phenolic plastic circular friction plate mounted horizontally on the lower end of the vertical shaft of an electric motor-driven drill press; and (3) means for holding the steel cup in stationary position throughout the operation of the apparatus.

In conducting the test, a 350-gram sample of a Mid-Continent, solvent-refined lubricating oil blend (having a viscosity value of 40 SUS at 210° F. and a viscosity index value of about 95) containing the additive to be tested is heated in a beaker at 150° C. for 17 hours while air is bubbled through the oil at a rate of 1 cubic foot per hour. During this heating a lead strip (31 grams), a copper screen (55 grams), and an iron screen (125 grams) are immersed in the oil to promote oil degradation such as encountered in actual service of the oil in many machines. A 4-gram sample of the oxidized lubricant is then placed in the steel cup and heated to approximately 200° F. The plastic friction plate, while being rotated at a speed of about 80 r.p.m. on its vertical center axis as driven through the drill press shaft by a 0.75 horsepower electric motor, is lowered toward the steel cup containing the lubricant and eventually pressed under a load of about 175 pounds into close face contact with the base of the stationary steel cup; after about two minutes of rubbing of the friction plates to attain equilibrium conditions, a noise-intensity reading is taken on the recording meter. The noise-intensity is recorded on an arbitrary scale of from 0 to 500, 0 being indicative of the complete absence of noise and 500 being indicative of extreme noise development. On this scale a typical lubricating oil without the oil-soluble additive combinations of this invention gives a noise-intensity reading above 300 under the test conditions. A reduction of the noise-intensity reading to about 200 as a result of incorporation into the oil of chemical addition agents is considered as a substantial improvement, and a reduction to about 90 or less is considered as an excellent improvement.

The additives employed in this test are identified as follows:

COMPONENT A.—PHOSPHORODITHIOATE ADDITIVE

A-1: Zinc di(isooctyl)phosphorodithioate.
A-2: Zinc salt of a phosphorodithioic acid made by reacting phosphorus pentasulfide with an alcohol mixture of 65 mole-percent of isobutanol and 35 mole-percent of isopentanol.
A-3: Barium salt of a phosphorodithioic acid made by reacting phophorus pentasulfide with an alcohol mixture of 50 mole-percent of capryl alcohol, 37.5 mole-percent of 4-methyl-2-pentanol, and 12.5 mole-percent of cyclohexanol.

A-4: Zinc di(tridecyl)phosphorodithioate.

A-5: Zinc di(heptyl phenyl)phosphorodithoiate.

A-6: A mixture of 46 weight-percent of zinc di(isootyl) phosphorodithioate and 54 weight-percent of zinc di-(methylcyclohexyl)phosphorodithioate.

COMPONENT B.—FATTY AMIDE ADDITIVE

B-1: An amide mixture consisting of, by weight, 91% oleamide, 6% stearamide, and 3% linoleamide.

B-2: An amide mixture consisting of, by weight, 49% lauramide, 17% myristamide, 9% palmitamide, 8% capyrylamide, 7% capramide, and 10% of $C_{18}$ fatty acid amides.

B-3: N-butyl oleamide.

B-4: Amide of petroleum naphthenic acid having an acid number of 230–240.

B-5: An equal weight mixture of N-octadecyl substituted amide of the fatty acid derived from tall oil and the amide identified as B-1.

Table 1

CHATTERING TEST

| Lubricant | Additives Tested | | Chattering Intensity Reading |
|---|---|---|---|
| | Phosphorodithioate Additive, percent by weight as phosphorus | Amide Additive, percent by weight | |
| 1 | None | None | 310 |
| 2 | A-1  0.1 | None | 310 |
| 3 | A-2  0.1 | None | 260 |
| 4 | A-3  0.1 | None | 320 |
| 5 | A-4  0.2 | None | 260 |
| 6 | None | B-1  0.25 | 330 |
| 7 | None | B-2  0.5 | 320 |
| 8 | None | B-3  0.75 | 330 |
| 9 | None | B-4  0.5 | 320 |
| 10 | None | B-5  0.1 | 320 |
| 11 | A-1  0.1 | B-1  0.5 | 90 |
| 12 | A-1  0.05 | B-1  0.25 | 90 |
| 13 | A-1  0.1 | B-1  0.25 | 70 |
| 14 | A-1  0.05 | B-1  0.1 | 150 |
| 15 | A-2  0.1 | B-2  0.5 | 80 |
| 16 | A-3  0.5 | B-4  0.5 | 70 |
| 17 | A-4  0.2 | B-3  0.75 | 60 |
| 18 | A-5  0.15 | B-1  0.1 | 200 |
| 19 | A-1  0.1 | B-1  0.5 | 70 |
| 20 | A-1  0.1 | B-5  1 | 50 |

Although the additive combinations of this invention are of value when used alone in a lubricating oil, it is often desirable that the lubricant be improved not only with respect to the friction characteristics described above, but also with respect to other properties as well. Thus, in the lubrication of hypoid gears such as used in automotive differentials, the lubricant used should also possess high thermal stability and resistance to formation of corrosive degradation products, superior extreme-pressure lubricating characteristics, low pour point, resistance to foam, etc. For use in automatic or manual transmission units, the lubricant should further possess dispersant properties and high viscosity index values. These properties whenever they are called for, may be provided by the incorporation in the lubricating oil of various chemical additives well-known in the art. Oxidation and corrosion inhibition properties may be provided by the addition of phosphorus sulfide-treated cyclic olefinic substances, substituted phenolic compounds, aryl amines, and other known inhibitors. The desirable viscosity characteristics may be imparted to the oil by such well-known polymeric additives as poly(alkyl acrylates) and poly(alkyl methacrylates), isobutene polymers, etc. Foam suppression may be effected by the use of silicone type substances or poly(alkyl acrylates). Additives which are capable of imparting superior extreme-pressure characteristics to the oil are also well-known in the art, and the commonly employed extreme-pressure additives may be exemplified by organic sulfides and polysulfides, xanthates, phosphorus sulfide treated fatty oils and chlorinated hydrocarbons. Dispersant additives which are commonly used in lubricating oils are illustrated by the normal and basic metal salts of alkyl phenols and alkyl phenol sulfides; the normal and basic metal salts of, e.g., long chain hydrocarbon sulfonic acids, acidic reaction products of a phosphorus sulfide with olefin polymers, acidic reaction products of a phophorus chloride with chlorinated hydrocarbons, acidic reaction products of olefin polymer, sulfur, and phosphorus trichloride; normal or basic salts of long chain fatty acids, etc.

The utility of the additive combinations of this invention in lubricants for automotive transmissions is shown by the results of the Cadillac Hydramatic Transmission Lubricant Test. In this test, the lubricant to be evaluated is employed as the transmission lubricant in a 1956 hydramatic transmission connected to a 1956 Cadillac engine operated for 300 hours under the following conditions.

Operating cycle:
  15 seconds at idle.
  45 seconds at 2100 r.p.m. in fourth gear at a load of 59.5 brake horsepower (acceleration through first, second, and third gears).

Transmission oil sump temperature: 300° F.
Engine water-outlet temperature: 160°–170° F.
Crankcase oil temperature: 250° F.

After completion of the test, the transmission is dismantled and the amount of sludge and varnish formed are noted and rated on a numerical scale of 10 to 0, 10 being indicative of no sludge or varnish, 7.5 being indicative of a trace of sludge or varnish formed, and 0 being indicative of heavy sludge or varnish formation. The duration of the test prior to the development of a chatter-like noise is also noted. To a Mid-Continent, solvent-refined lubricating oil blend having a viscosity of 40 SUS at 100° F. and a viscosity index of about 95 and containing the usual amounts of a commercial ashless, nitrogen-containing dispersant additive, silicone-type anti-foam agent, a polymethacrylate type viscosity-index improving agent, and wax alkylated naphthalene type pour-point depressant, there was added 0.1% by weight as phosphorus of zinc di-isooctylphosphorodithioate and 0.25% by weight of the fatty acid amide identified previously as B-1. When this lubricant was subjected to the above test it gave a sludge rating of 7.4 and a varnish rating of 8.9. There was no chatter noise for over 150 hours.

The efficacy of the additive combinations in lubricant compositions for use in automotive differentials is shown by the results, summarized in Table II, of the Chevrolet "Power-Lok" Differential Lubricant Test. In this test, the lubricant to be evaluated is used as the differential lubricant in a 1956 8-cylinder Chevrolet passenger car equipped with Powerglide transmission and "Power-Lok" differential ("locking" type differential). The car is driven for 15 minutes to establish equilibrium conditions, and then the development of noise noted as the car is turned abruptly both while in forward and reverse gears. The lubricant base used in this test is an SAE 90 mineral lubricating oil to which there has been added the usual amounts of a commercial alkenylsuccinic acid rust inhibitor, polyalkylmethacrylate type anti-foam agent, commercial extreme-pressure additive consisting of a mixture of a chlorinated paraffin wax and an alkyl polysulfide.

A specific embodiment of the invention is illustrated by the incorporation into an SAE 90 mineral oil of 3.36% of chlorinated paraffin wax (containing 50% chlorine), 2.0% (0.16% as phosphorus) or zinc di-(4-methylamyl-2) phosphorodithioate, 0.1% of the amide mixture designated previously as B-1, 0.05% of an alkenylsuccinic acid prepared by the alkylation of maleic anhydride with tetrapropylene and subsequent hydrolysis of the alkenylsuccinic anhydride, and 400 p.p.m. of a low molecular weight polymer of butyl acrylate. Such a lubricant is useful for the purposes mentioned earlier herein.

Table II
DIFFERENTIAL LUBRICANT TEST

| Lubricant | Phosphorodithioate Additive, percent wt. as phosphorus | | Amide Additive, percent by wt. | | Noise Forward | Noise Reverse |
|---|---|---|---|---|---|---|
| 1 | zinc(4-methyl-pentyl-2) phosphorodithioate | 0.16 | Amide identified previously as B-1 | 0.13 | None | None. |
| 2 | ___do___ | 0.36 | ___do___ | 0.31 | ___do___ | Do. |
| 3 | ___do___ | 0.28 | Amide of fatty acid derived from tall oil. | 0.5 | ___do___ | Do. |
| 4 | ___do___ | 0.3 | Amide identified previously as B-1 | 1 | ___do___ | Do. |
| 5* | zinc salt of a phosphorodithioic acid obtained by reaction of $P_2S_5$ with an alcohol mixture of 60 mole-percent isopropanol and 40 mole-percent of 4-methyl-pentanol-2. | 0.64 | ___do___ | 0.5 | ___do___ | Do. |
| 6 | zinc(4-methyl-pentyl-2) phosphorodithioate | 0.3 | ___do___ | 0.5 | ___do___ | Do. |
| 7 | ___do___ | 0.3 | None | | Severe | Severe. |
| 8 | None | | ___do___ | | ___do___ | Do. |

*Contains no chlorinated paraffin wax.

The use of the expression "oil-soluble carboxy amide" in this specification and in the appended claims may denote a single amide or a mixture of two or more amides. By the term "oil-soluble," as used herein, it is intended to indicate the property of the additive to form not only true solutions with the oil to which they are added, but also the property to form therewith any form of substantially permanently homogenous composition.

Other modes of applying the principle of the invention may be employed, change being made as regards the details described, provided the features stated in any of the following claims or the equivalent of such be employed.

We therefore particularly point out and distinctly claim as our invention:

1. A lubricant composition consisting essentially of a major proportion of a mineral lubricating oil and in combination therewith from about 0.01 to about 2.0 percent by weight of phosphorus of an oil-soluble group II metal phosphorodithioate and from about 0.05 to about 3.0 percent by weight of an oil-soluble carboxy amide having the structural formula

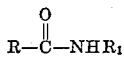

where R is an aliphatic hydrocarbon radical having at least about 12 carbon atoms and $R_1$ is selected from the class consisting of aliphatic hydrocarbon radicals and hydrogen.

2. The lubricant composition of claim 1 characterized further in that the group II metal phosphorodithioate is a zinc dialkylphosphorodithioate.

3. The lubricant composition of claim 1 characterized further in that the group II metal phosphorodithioate is a barium dialkylphosphorodithioate.

4. The lubricant composition of claim 1 characterized further in that the oil-soluble carboxy amide contains from about 16 to about 24 aliphatic carbon atoms.

5. A lubricant composition consisting essentially of a major proportion of a mineral lubricating oil and in combination therewith from about 0.05 to about 1.0 percent by weight as phosphorus of a zinc dialkylphosphorodithioate and from about 0.1 to about 1.0 percent by weight of a fatty acid amide having from about 16 to about 24 aliphatic carbon atoms and having the structure $RCONH_2$ where R is an aliphatic hydrocarbon radical.

6. The lubricant composition of claim 5 characterized further in that there is a total of at least about 7.6 aliphatic carbon atoms in the two alkyl radicals of the zinc dialkylphosphorodithioate.

7. The lubricant composition of claim 5 characterized further in that each of the alkyl radicals of the zinc dialkylphosphorodithioate contains from about 4 to about 12 carbon atoms.

8. The lubricant composition of claim 5 characterized further in that the zinc dialkyl posophorodithioate is zinc dioctylphosphorodithioate.

9. The lubricant composition of claim 5 characterized further in that the zinc dialkyl phosphorodithioate is zinc dihexylphosphorodithioate.

10. The lubricant composition of claim 5 characterized further in that the fatty acid amide is oleamide.

11. The lubricant composition of claim 5 characterized further in that the fatty acid amide is lauramide.

12. The lubricant composition of claim 5 characterized further in that the fatty acid amide is a mixture of fatty acid amides having an average of about 18 carbon atoms in the fatty radicals.

References Cited in the file of this patent

UNITED STATES PATENTS

| | | |
|---|---|---|
| 2,018,758 | Ellis | Oct. 29, 1935 |
| 2,358,581 | Lieber | Sept. 19, 1944 |
| 2,364,283 | Freuler | Dec. 5, 1944 |
| 2,710,842 | Heisig et al. | June 14, 1955 |
| 2,934,499 | Goldschmidt | Apr. 26, 1960 |